(12) United States Patent
Johnson

(10) Patent No.: US 8,776,909 B2
(45) Date of Patent: Jul. 15, 2014

(54) DOUBLE HEADED HAND-POWERED CULTIVATOR

(76) Inventor: Alan L. Johnson, Pine River, MN (US)

( * ) Notice: Subject to any disclaimer, the term of this patent is extended or adjusted under 35 U.S.C. 154(b) by 111 days.

(21) Appl. No.: 13/036,929

(22) Filed: Feb. 28, 2011

(65) Prior Publication Data

US 2012/0217030 A1    Aug. 30, 2012

(51) Int. Cl.
*A01B 1/00* (2006.01)
*A01B 1/06* (2006.01)

(52) U.S. Cl.
CPC ..................................... *A01B 1/065* (2013.01)
USPC ........................................................ 172/371

(58) Field of Classification Search
CPC ................................... A01B 1/00; A01B 1/10
USPC ................................................. 172/371, 372
See application file for complete search history.

(56) References Cited

U.S. PATENT DOCUMENTS

| | | | |
|---|---|---|---|
| D27,173 S * | 6/1897 | Steel | D8/7 |
| 1,196,663 A * | 8/1916 | Clore | 172/371 |
| 1,204,323 A * | 11/1916 | Sohn | 172/378 |
| 1,268,734 A * | 6/1918 | Lay | 403/66 |
| 1,328,537 A * | 1/1920 | Neuman | 172/375 |
| 1,775,044 A * | 9/1930 | McConnell | 403/204 |
| 1,954,854 A * | 4/1934 | Vonderahe | 172/371 |
| 2,316,446 A * | 4/1943 | Matsunaga | 30/169 |
| 2,794,689 A * | 6/1957 | Rubrum | 403/301 |
| 2,842,789 A * | 7/1958 | Wells | 15/121 |
| 3,952,812 A | 4/1976 | Lucan | |
| 4,011,612 A | 3/1977 | Atkinson | |
| 4,162,132 A | 7/1979 | Kress et al. | |
| 4,214,538 A | 7/1980 | Druskin et al. | |
| 4,286,893 A * | 9/1981 | Pomares | 403/301 |
| D274,116 S | 6/1984 | Lidikay | |
| 4,476,939 A | 10/1984 | Wallace | |
| 4,478,033 A | 10/1984 | Konyn et al. | |
| 4,546,831 A | 10/1985 | Albertson | |
| 4,564,072 A | 1/1986 | Corbett | |
| 4,565,398 A | 1/1986 | Poulin | |
| 4,606,089 A | 8/1986 | King | |
| 4,730,679 A | 3/1988 | Tallerico et al. | |
| 4,786,095 A | 11/1988 | Dumont | |
| 4,890,679 A | 1/1990 | Jacobs | |
| 4,901,801 A | 2/1990 | Popivalo | |
| 4,915,179 A | 4/1990 | Hawk | |
| 5,003,760 A | 4/1991 | Webb | |
| 5,004,053 A | 4/1991 | Martell | |
| 5,060,343 A | 10/1991 | Nisenbaum | |
| 5,185,992 A | 2/1993 | Garcia | |
| 5,411,101 A | 5/1995 | Bonavitacola | |
| 5,452,769 A | 9/1995 | Markert | |
| 5,461,849 A | 10/1995 | Allen | |
| 5,477,929 A * | 12/1995 | Kenyon et al. | 172/372 |
| 5,674,022 A * | 10/1997 | Liao | 403/24 |
| 5,799,996 A | 9/1998 | Fredrickson | |

(Continued)

FOREIGN PATENT DOCUMENTS

JP        02232182 A  *  9/1990  .............. B25G 1/10

*Primary Examiner* — Thomas B Will
*Assistant Examiner* — Joel F. Mitchell
(74) *Attorney, Agent, or Firm* — Boyle Fredrickson, S.C.

(57) ABSTRACT

A garden cultivation tool with a primary implement head demountably attached to one end of a handle and a secondary implement head demountably attachable to either side of the other end of the handle, each secondary attachment location positioned at an offset angle about the longitudinal axis relative to the primary implement head.

4 Claims, 6 Drawing Sheets

(56) References Cited

U.S. PATENT DOCUMENTS

| | | | |
|---|---|---|---|
| 5,810,408 A * | 9/1998 | Armstrong | 294/57 |
| 5,816,633 A | 10/1998 | Odom | |
| 5,848,653 A * | 12/1998 | Warter | 172/381 |
| 5,871,058 A | 2/1999 | Nacarro et al. | |
| 6,138,769 A * | 10/2000 | Breyer | 172/380 |
| 6,155,620 A * | 12/2000 | Armstrong | 294/57 |
| 6,328,513 B1 * | 12/2001 | Niwa et al. | 411/339 |
| 6,644,702 B2 * | 11/2003 | Liou | 294/57 |
| 6,988,561 B1 | 1/2006 | Campbell | |
| 7,059,420 B1 | 6/2006 | Wei | |
| 7,134,263 B2 | 11/2006 | Tedesco | |
| 7,419,343 B2 * | 9/2008 | Nagayama | 411/179 |

* cited by examiner

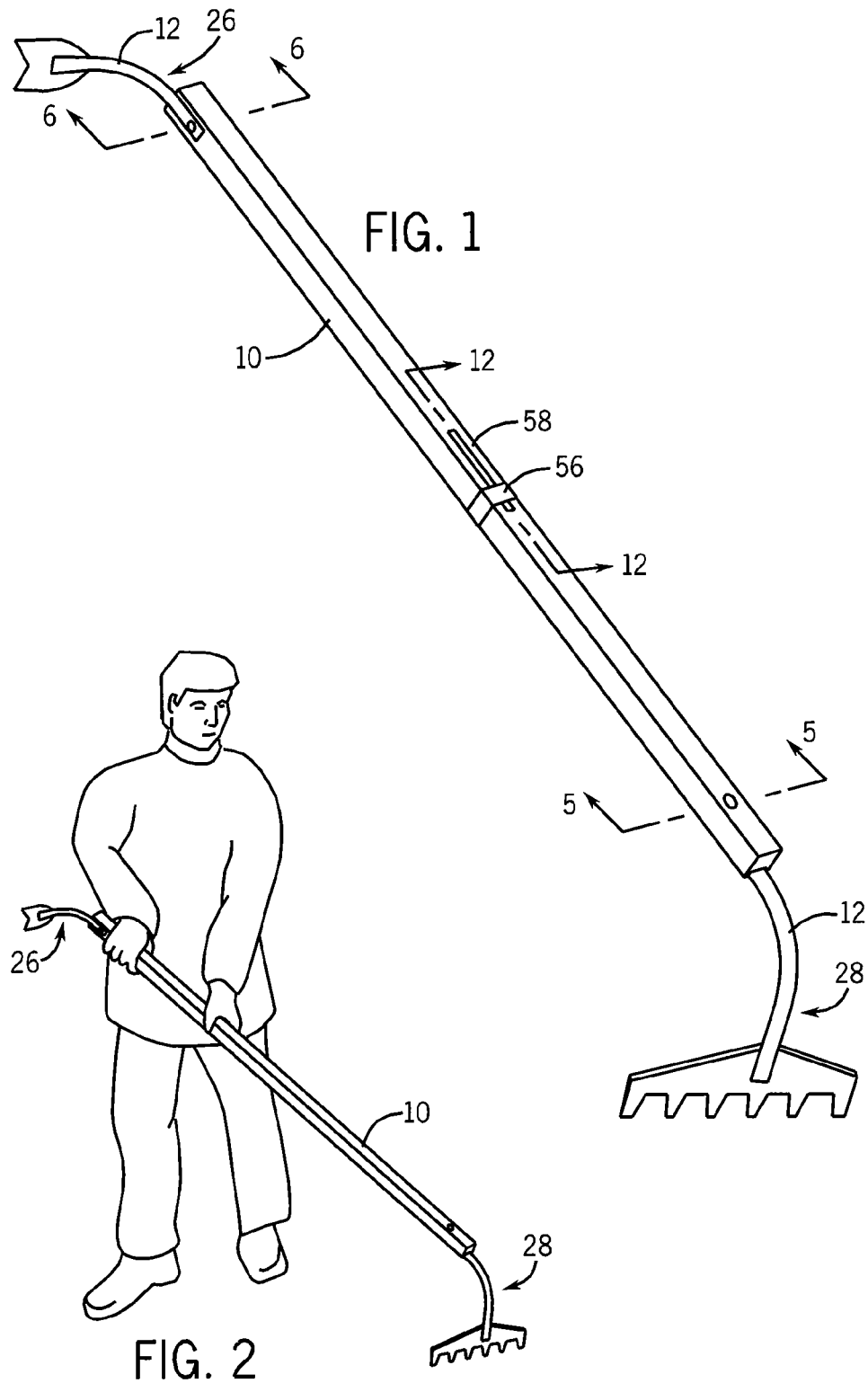

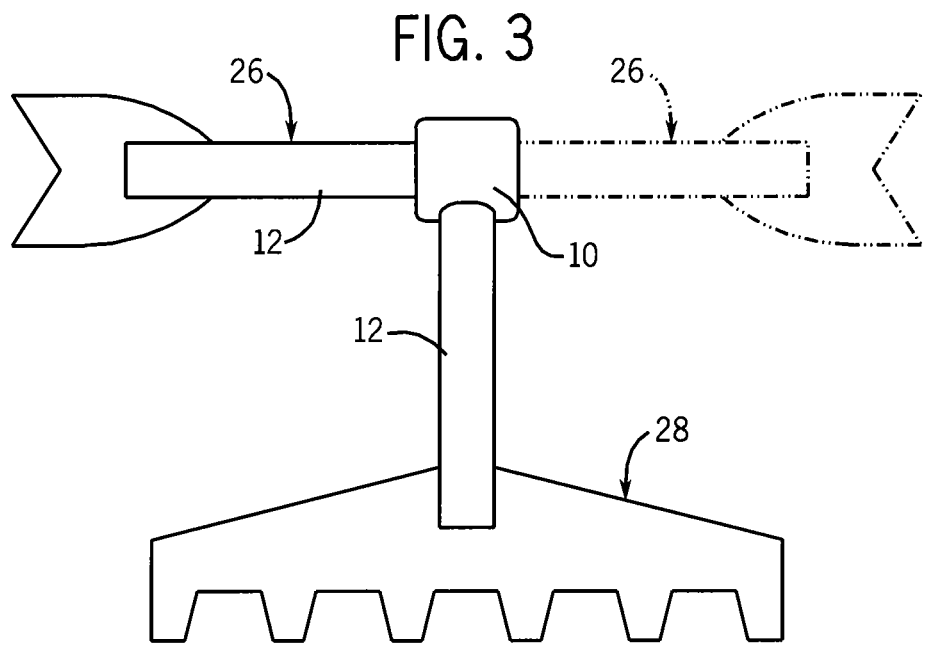
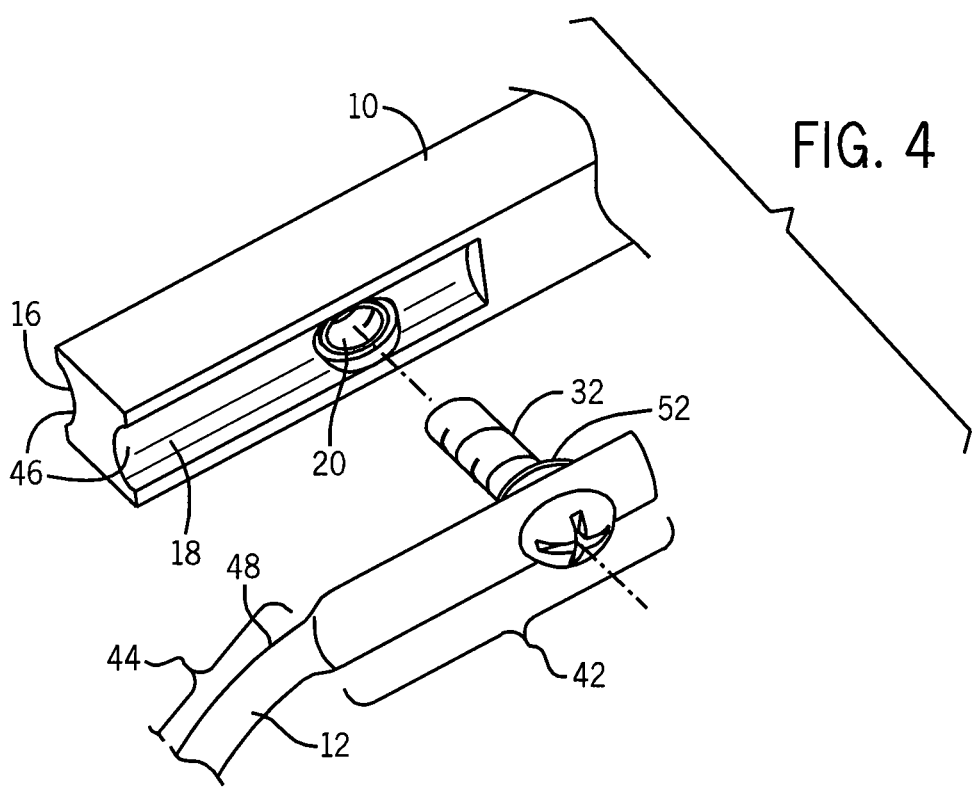

DOUBLE HEADED HAND-POWERED CULTIVATOR

CROSS-REFERENCE TO RELATED APPLICATIONS

Not applicable

FEDERALLY SPONSORED RESEARCH

Not applicable

SEQUENCE LISTING OR PROGRAM

Not applicable

BACKGROUND OF THE INVENTION

Field of Invention

This invention relates to hand powered garden weeding and cultivation tools, specifically multiple-use garden tools.

Background of the Invention

Hand cultivation devices are one of the earliest tools used by man, probably starting with a sharpened stick. Very early hoe design used stone or bone blades. As new materials and manufacturing methods became available, hand hoes became more efficient, progressing from copper to bronze, iron, and finally, steel and aluminum.

As a gardener weeds and cultivates his garden, he often encounters varied conditions such as a narrow gap between cultivated plants; large areas of weed growth; perhaps a large area of small, shallow rooted weeds, or a much larger, deep rooted weed. In the same garden he usually encounters weeds with thick, woody stems and weeds with shallow, succulent roots. He may encounter an area of hard-packed soil that needs to be tilled to improve aeration and water absorption. Obviously, one weeding tool is not efficient for all the weeding and cultivation situations a gardener typically encounters as he progresses through his garden with cultivation tasks.

A wide cutting edge is most efficient when larger areas of small, shallow rooted weeds are encountered. Conversely, a narrow cutting edge is best to "root-out" larger, deep rooted weeds or when the weeds are between closely spaced plants. Other cultivation tasks might include forming a furrow for planting seeds or bulbs or forming a channel for irrigation. Each of these tasks are best accomplished with specialized implements and garden grooming can be much more efficient if the gardener has a 'multi-task' tool at his/her disposal.

To meet the various garden cultivation challenges, numerous hoe designs have attempted to make multipurpose tools for weeding and tilling. These designs most often have been based on one of three common themes—1) placing multiple and varied cutting surfaces on the same blade or 2) placing quick change connections on the hoe handle to accommodate hoe heads of various designs. 3) two opposed implement heads on the same end of the handle. A fourth, less commonly used approach, is to place two distinct implements on either end of a common handle. This is the approach my invention utilizes, as described below. In addition, my invention permits the quick change of the implement heads.

The prior art search also discovered one invention that incorporated two implements, one of which retracts into the handle: U.S. Pat. No. 4,483,133 (1984)

The following listing identifies prior art in each of the categories listed above:

Multiple Implements on Same Head (Multiple Surface)

| | | |
|---|---|---|
| 5,004,053 (1991) | 4,730,679 (1988) | 5,452,769 (1995) |
| 4,901,801 (1990) | 4,564,072 (986) | 6,988,561 (2006) |
| 4,890,679 (1990) | | |

Quick Change Implement Head

| | | |
|---|---|---|
| 4,786,095 (1988) | 5,871,058 (1999) | 4,214,538 (1980) |
| 4,565,398 (1986) | 4,476,939 (1984) | 4,606,089 (1986) |
| 7,059,420 (2006) | 4,162,132 (1979) | 5,799,996 (1998) |
| 5,185,992 (1993) | 5,060,343 (1991) | |

Opposed Implement Heads on Same End

| | | |
|---|---|---|
| 5,816,633 (1998) | Des 274,116 (1984) | 7,134,263 (2006) |
| 5,003,760 (1991) | 4,546,831 (1985) | 5,461,849 (1995) |
| 7,059,420 (2006) | 5,411,101 (1995) | 4,915,179 (1990) |
| 3,952,812 (1976) | | |

Implement Head on Each End of Handle

| | |
|---|---|
| 4,011,612 (1977) | 4,478,033 (1984) |

The "quick change" designs are usually expensive to manufacture, often not strong enough to stand up to the abuse of long-term use, or quite inconvenient to use—especially considering the many varied requirements that can be encountered during the cultivation of a given crop. It is not practical to change the implement head numerous times as the gardener makes his way down the row. Thus, the changeable head does not provide a convenient way to present the ideal tool head for the varied cultivation conditions encountered in a typical row of garden plants. Typical conditions can include deep-rooted weeds, shallow rooted weeds, narrow weed choked areas, wide weed choked areas, hard-packed soil areas, and areas of good tilth. Another disadvantage frequently found in the 'quick change' approach is that the attachment mechanism often protrudes out from the handle where it conflicts with the operator or snags on plants. An example of this design is U.S. Pat. No. 4,786,095 (1988).

The 'multiple surface' designs always involve compromise that can affect weight, balance and leverage, which makes the tool cumbersome or awkward to use. See U.S. Pat. No. 5,004,053 (1991) and U.S. Pat. No. 4,730,679 (1988) for examples. One combination can involve a narrow edge for 'tight' spots and deep tilling and a wide edge for the wider cultivation areas or shallow tilling. For example, a long, narrow blade can have working edges on both the narrow and wide sides. This type of "multiple working edge" approach can present a problem—when using the narrow side of a long, narrow blade, the long side projects up where it can damage the lower branches of the crop. A variation of this concept involves placing two implements on the same end of the handle, one facing up and the other facing down (Opposed Implement Heads). U.S. Pat. D274,116 (1984) and U.S. Pat. No. 4,890,679 (1990) are examples of this approach. The 'opposed implement head design' generally has disadvantages similar to those described for the 'multiple surface design' described above.

A few examples can be found of another type of multiple-use garden cultivator. This approach places separate implement heads on opposing ends of the same handle. (See U.S. Pat. No. 4,478,033 (1984) and U.S. Pat. No. 4,011,612 (1977). With this design, the gardener can quickly switch to a second implement head by 'flipping' the handle so that the implement head on the other end is placed into use. Two implement heads on a common handle makes it possible to design each one for maximum efficiency without the compromise that is inherent in a 'single head/multiple-use' tool.

However, there is a potential disadvantage to placing an implement head on each end of the same handle. The 'non-working' head is in a position where it can cause inconvenience or even injury to the operator. The fact the non-working implement can conflict with the operator is the likely reason this approach to tool design has seldom been used effectively. My invention describes a two-implement tool which has a simple attachment mechanism that does not protrude from the handle, which allows the operator to grip the handle in any location, even on the attachment mechanism. Also, the implements on my invention do not conflict with the operator and, in fact, the non-working implement shank of my invention can be used as a hand grip for better control of the working implement. The implements of my invention can be changed quickly and easily so that they are 'paired up' to accommodate a wide range of cultivation tasks. The illustrations of this patent application describe two implements. However, a total of four implement heads have been designed and tested as attachments for this invention and many more implement head configurations are possible. From the selection of available implement heads, the gardener can choose a 'pair' to attach to the handle which are best suited to the particular cultivation tasks at hand.

BACKGROUND OF THE INVENTION

Objects and Advantages

Accordingly, besides the objects and advantages of the multipurpose cultivation tool described in my above patent, several objects and advantages of the present invention are:

(a) to provide a cultivation tool that is adaptable to various garden cultivation tasks.

(b) to provide a garden cultivation tool that is easy and economical to manufacture.

(c) to provide a garden cultivation tool that will utilize two distinctive implements on a common handle.

(d) to provide a garden cultivation tool that will provide a quick and easy method for changing the implement heads.

(e) to provide a garden cultivation tool that will offer a choice of two implement combinations for use on the same handle or can be used with only one implement head on the handle.

(f) to provide a garden cultivation tool that is configured so that the non-working implement head is not in conflict with the operator when the tool is in use.

(g) to provide a garden cultivation tool that is easy and practical to package and ship.

(h) to provide a tool that has optimum efficiency in terms of mechanical advantage for the operator.

(i) to provide a tool that is designed with ergonomic principles in mind so that long term or intensive use will be less likely to tire or injure the operator.

(j) to provide a tool that can be easily switched from a long handle configuration to a short handle configuration.

(k) to provide a cultivation tool which can easily and quickly be converted from left hand operation to right hand operation using an 'on-board' attachment/detachment tool or a commonly available tool such as a screwdriver.

(l) to provide a tool which will accept a wide range of implement heads for tilling, furrowing, hilling, raking, leveling, and various weeding tasks.

(m) to provide a tool in which a screwdriver or wrench used to remove or attach the various implement heads can be carried in the handle of said tool to expedite the rapid changing of the implement head.

(n) to provide a unique means of attaching an implement blade to an implement shank to reduce manufacturing costs.

Further objects and advantages will become apparent from consideration of the ensuing description and drawings.

SUMMARY

In accordance with the present invention, a garden cultivation tool including a handle accepting differential purpose (functionally diverse) implement heads on opposed ends of the handle, with attachment means for said implement heads which demountably secures them at a displaced angle relative to each other on the longitudinal axis of said tool.

DRAWINGS

Figures

FIG. 1 shows an overall perspective view with a bear claw implement and a duck foot implement attached.

FIG. 2 shows my invention in use by the operator.

FIG. 3 is a frontal view showing left-hand and right-hand attachment positions for the implement heads. The bear claw and duck foot implement heads are illustrated.

FIG. 4 is a perspective view showing the implement head attachment means.

Figure 8:
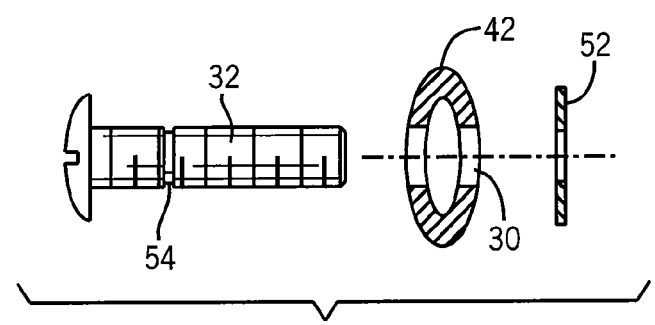

FIG. 8 further illustrates how the shank bolt, shank, and bolt retaining clip are connected together.

Figure 9:
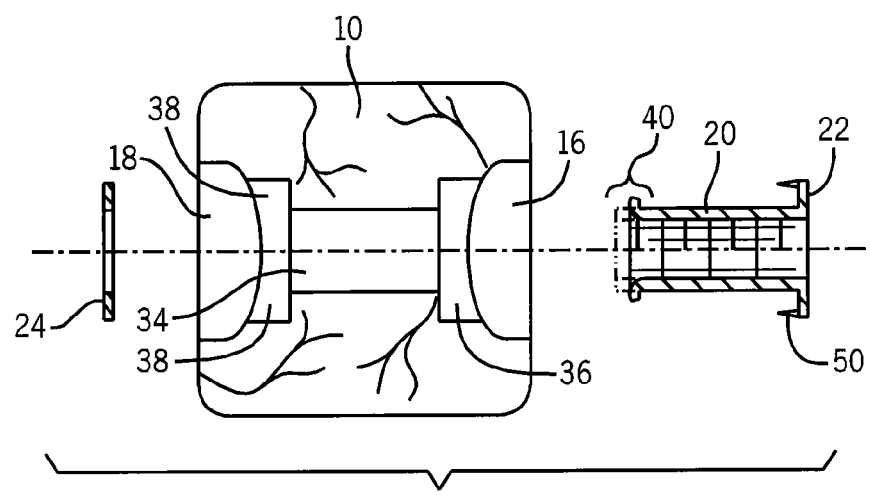

FIG. 9 is a cross section at location 6 of FIG. 1 which shows how bolt tube 20 is installed into handle 10.

Figure 10:
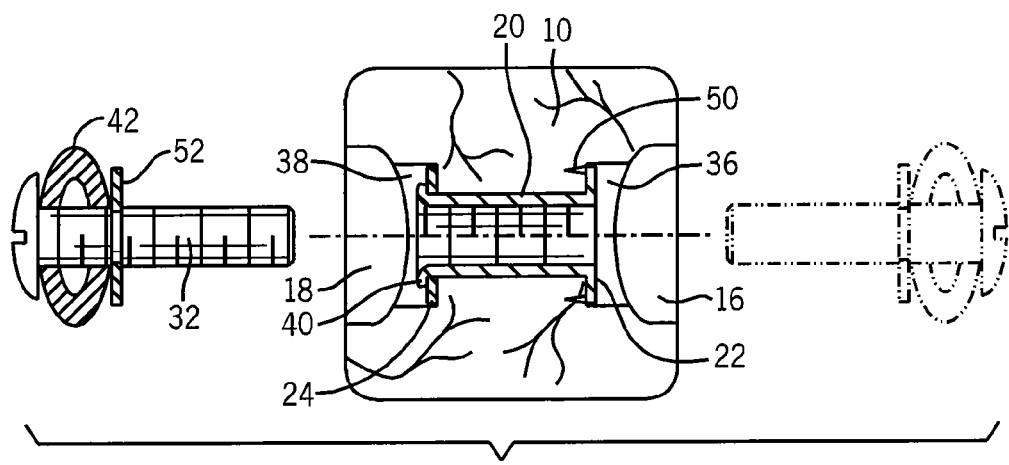

FIG. 10 is a cross section at location 6 of FIG. 1, showing how an implement head is attached to either side of the handle using the same bolt tube.

Figure 11:
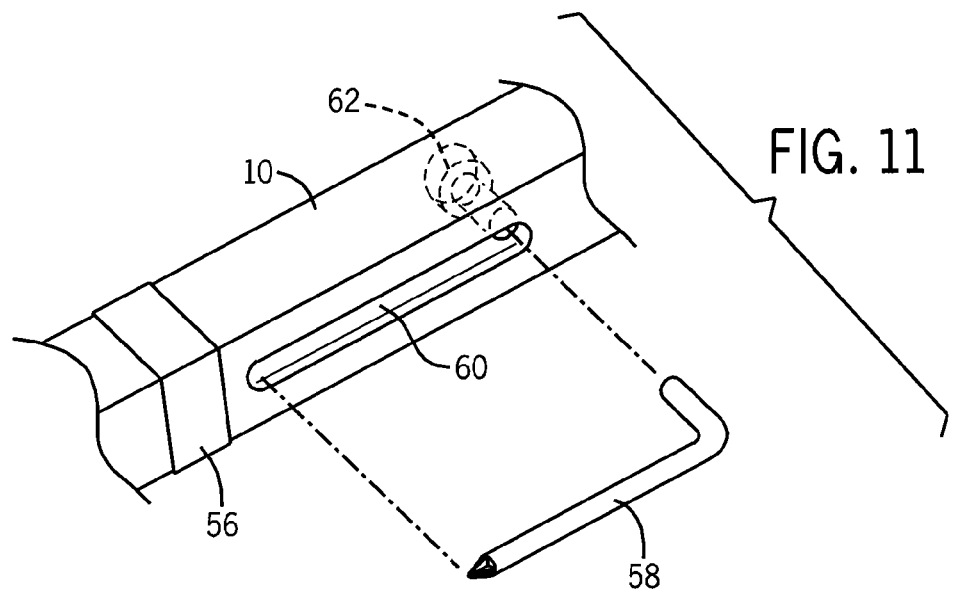

FIG. 11 is a perspective view of the central portion of the handle which illustrates the method for attaching and carrying a tool used to attach and detach the implement heads.

Figure 12:
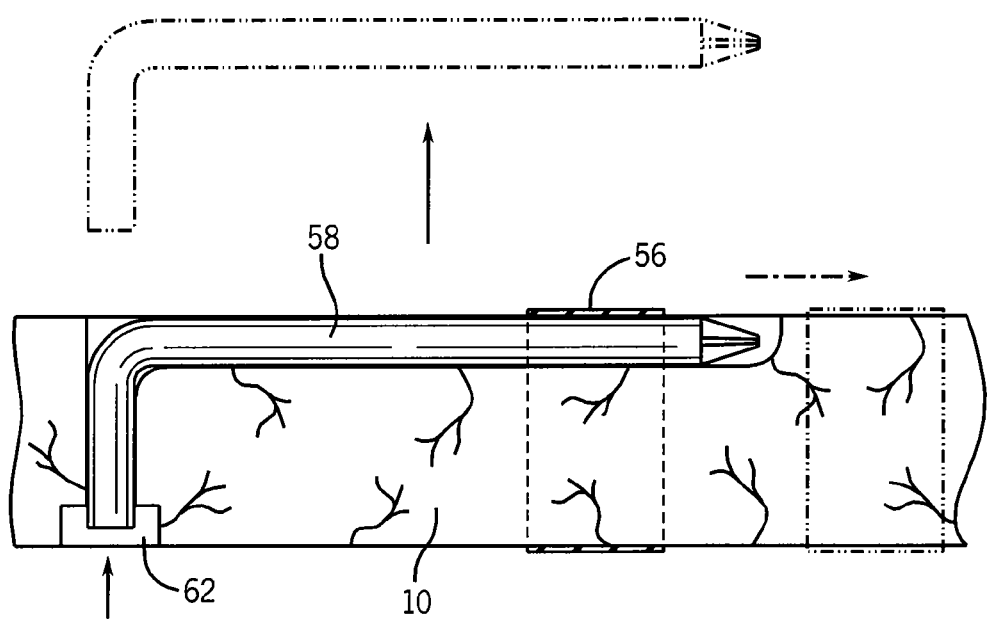

FIG. 12 is a cross-section view at location 12 of FIG. 1, which further illustrates how the tool is inserted into and removed from the handle and carried in the handle.

Figure 13A:
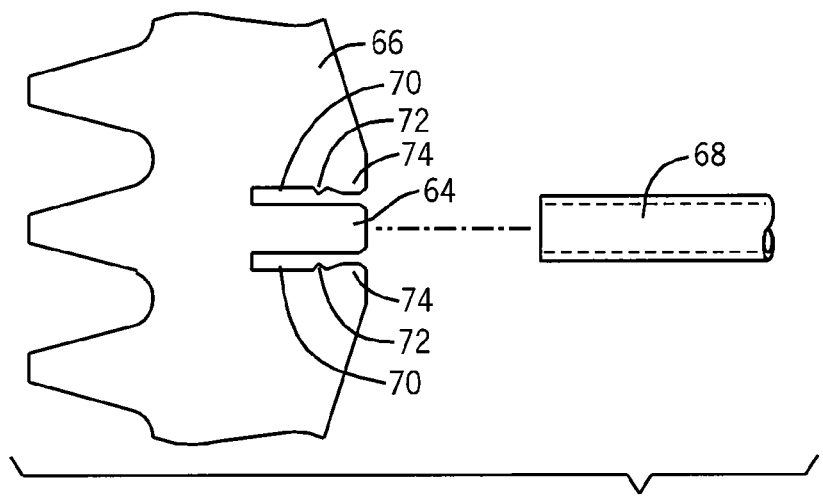

FIG. 13A illustrates a means for attaching a blade to a tubular blade shank, specifically showing the conformation of an aperture which is configured to accept a tubular shank for attachment.

Figure 13B:
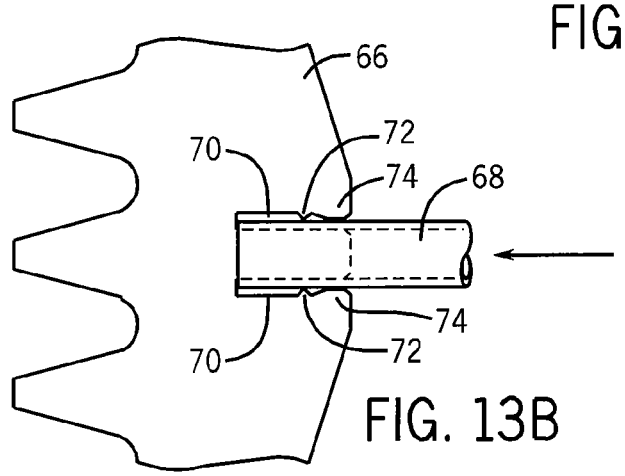

FIG. 13B shows the tubular shank inserted into the blade aperture prior to the flattening of the lower portion of the shank.

Figure 13C:
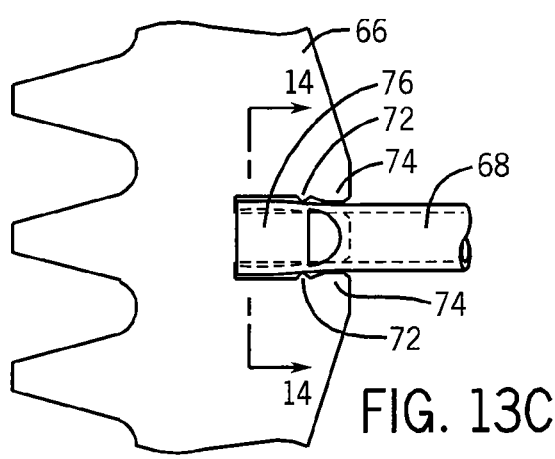

FIG. 13C shows the completed attachment with the end of the tubular shank compressed onto the tang of the blade which compresses it against the outside wall of the aperture.

Figure 14:
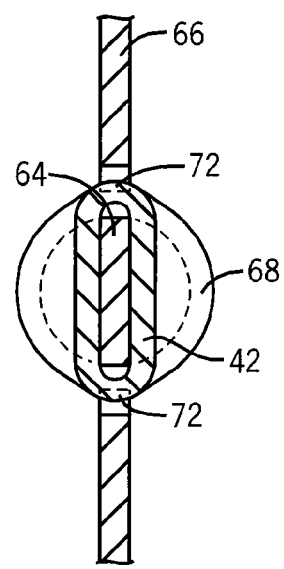

FIG. 14 is a cross-section of the completed attachment at location 14 on FIG. 13C.

DRAWINGS - Reference Numerals

10. Handle
12. Shank
14. Primary Shank Channel
16. Left-hand Shank Channel
18. Right-hand Shank Channel
20. Bolt Tube
22. Bolt Tube Retainer Plate
24. Bolt Tube Retainer Washer
26. Duck Foot Implement Head
28. Bear Claw Implement Head
30. Shank Bolt Hole
32. Shank Bolt
34. Bolt Tube Through-hole
36. Bolt Tube Retainer Plate Recess
38. Bolt Tube Retainer Washer Recess
40. Bolt Tube Flair End
42. Flattened Shank Portion
44. Round Shank Portion
46. Handle Fulcrum Area
48. Shank Fulcrum Area
50. Bolt Tube Retaining Plate Prongs
52. Bolt Retaining Clip
54. Retaining Clip Groove
56. Elastic Retention Band
58. Attachment/Detachment Tool
60. Tool Recess Groove
62. Finger Recess
64. Blade Tang
66. Blade
68. Shank Tube
70. Blade Aperture
72. Grip Nub
74. Capture Shoulder

DETAILED DESCRIPTION OF THE PREFERRED EMBODIMENT

A preferred embodiment of the cultivation tool of the present invention is illustrated in FIG. 1. It consists of a handle 10 having a square cross section (for example constructed of wood) with two locations for implement heads (e.g. duck foot cultivation implement 26) on opposed sides of one end of the handle and a third location for an implement head (bear claw cultivation implement 28) on the other end of the handle. Each implement 26 and 28 is attached to a curved shank 12 so that it extends along an axis that curves away from the side of the handle 10 which is attached. The third implement attachment position lies at a 90 degree angle in relation to the two attachment locations on the other end of the handle 10 and accordingly the bear claw cultivation implement 28 extends away from the handle in a plane at 90 degrees with respect to a plane of extension of the duck foot cultivation implement 26 at the other end of the handle 10.

A wide variety of cultivation tools can be provided for this invention. FIG. 1 shows a 'duck foot' cultivation implement 26 attached to the upper end of the handle and a 'bear claw' cultivation implement 28 attached to the other end. The duck foot cultivation implement 26 provides a blade that is approximately two inches wide in the direction perpendicular to the curved axis of the shaft 12 and has a V-shaped notch in the distal edge to provide for opposed outwardly extending triangular tines. The bear foot cultivation implement has a blade that is approximately eight inches wide whose distal edge is serrated with a set of trapezoidal evenly spaced teeth each about one inch in depth. Both implements 26 and 28 when mounted orient their distal edges perpendicular to an extent of the handle 10. The implements 26 and 28 may be constructed of plate steel welded to a steel tube forming the shank 12.

The handle 10 can typically be 48 inches to 60 inches long for operation by a standing operator or 12 inches to 24 inches long for use when the operator is kneeling. The edges of the handle are rounded for a comfortable grip.

FIG. 2 shows the invention in use by an operator using one of a number of possible ways to position and hold this tool. In this mode of operation, the bear claw implement 28 is projecting downward toward the ground while the duck foot implement 26 is projecting away from the operator at a 90 degree angle to the plane of bear claw implement 28. To utilize the duck foot implement 26, the operator can flip the handle 'end-for-end'. The duck foot implement 26 would thereby project downward towards the earth while the bear claw implement 28 projects away from the operator at a 90 degree angle to the plane of the duck foot implement 26.

FIG. 3 shows Bear Claw implement 28 attached to one end of handle 10 and Duck Foot implement 26 attached to the other end of handle 10. It also illustrates the alternate location of implement 26 for 'left hand' operation.

FIG. 4 illustrates how shank 12 is removeably attached to handle 10. The partially flattened portion 42 of the tubular shank 12 has a though-hole 30 (See FIG. 7). Shank bolt 32 passes though shank bolt hole 30. Bolt 32 is held within shank hole 30 by retaining clip 52. Bolt 32 can be screwed into bolt tube 20 which has internal threads as shown in FIG. 10 and FIG. 4. When bolt 32, with retaining clip 52 attached, is inserted and tightened into bolt tube 20, shank 12 is held securely in shank channel 18. The shank of the implement head is captured within the shank channel on the handle, thereby preventing lateral movement of the shank in relation to the handle. A fulcrum point is present at the juncture of handle fulcrum area 46 and shank fulcrum area 48. This greatly reduces the 'pull-out' pressure on the bolt as the operator applies downward pressure on the handle, by virtue of the leverage advantage created by a fulcrum point.

Figure 5:
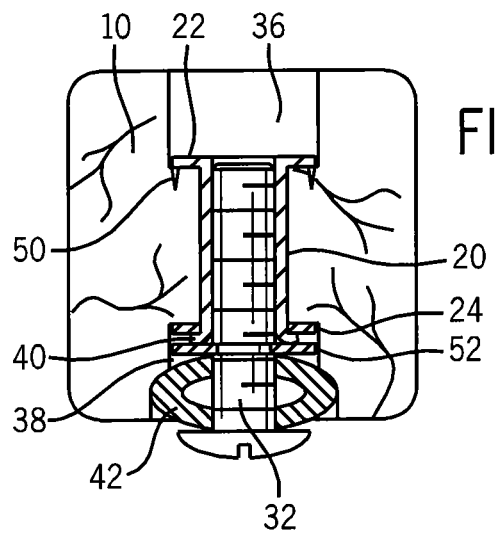
FIGS. 5 and 6 show a cross section of the handle at a plane through the bolt tube locations.
Figure 6:
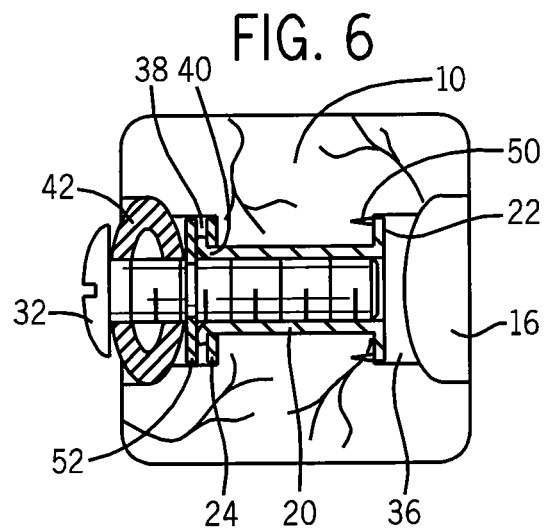

FIG. 5 and FIG. 6 are cross sections at the locations identified on FIG. 1, which illustrate the method by which bolt tube 20 is secured within handle 10. The handle 10 has bolt tube through-hole 34 (See FIG. 9 and FIG. 10 also). Bolt tube 20 is inserted into bolt tube through-hole 34 until bolt tube retainer plate 22 contacts the bottom of bolt tube retainer plate recess 36. When bolt tube retainer plate 22 has been inserted into bolt tube retaining plate recess 36, the bolt tube retaining plate prongs 50 will penetrate into handle 10 to restrict the bolt tube's rotation. Bolt tube 20 projects into bolt tube retaining washer recess 38. Bolt tube retaining washer 24 is inserted into bolt tube retaining washer recess 38 and over the projecting end of bolt tube 20. The projecting end of bolt tube 20 is flared by compressive force to capture bolt tube retaining washer 24. The bolt tube 20 is thereby secured within handle 10 so that tension forces or compressive forces exerted by shank bolt 32 will not dislodge it.

Figure 7:
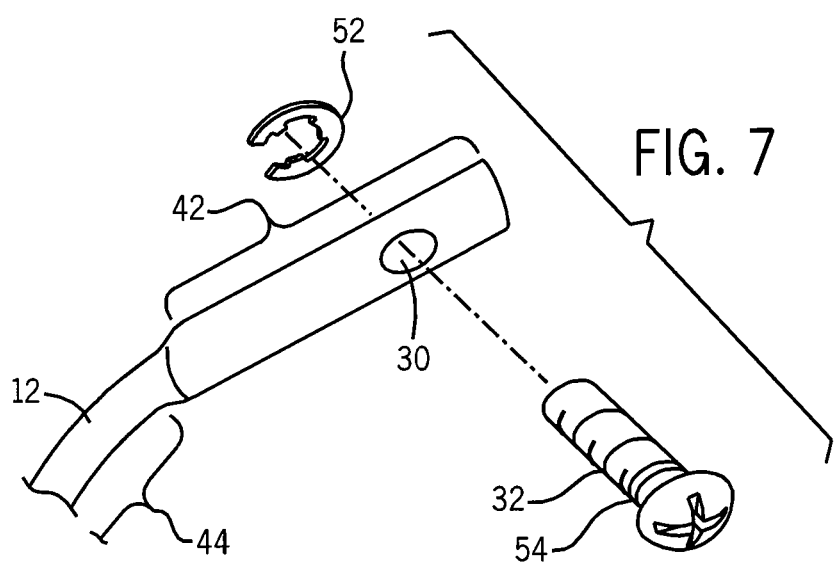
FIG. 7 shows a perspective view which illustrates how the shank bolt is retained in the shank bolt hole by means of a bolt retaining clip.

FIG. 7 and FIG. 8 specifically illustrates the mechanism by which shank bolt 32 is retained within shank bolt hole 30 by bolt retaining clip 52. Retaining clip groove 54 is a preferred embodiment when using an E-clip as illustrated, but not required for all types of bolt retaining clips.

FIG. 9 and FIG. 10 are cross sections to better illustrate the structure and assembly of the mechanism used to demountably attach the various implement heads to handle 10, as previously described above.

FIG. 1, FIG. 11 and FIG. 12 Additional Embodiments

In addition to Duck Foot Implement 26 and Bear Claw Implement 28, a diamond point implement and a furrowing implement are planned for inclusion in the implement choices available for this invention, although not shown or claimed. Many other implements could be made for attachment to this invention.

An 'on-board' storage means is provided for a tool for implement head attachment/detachment. A simple 'L-shaped' screwdriver or wrench can be stored in handle 10 so that it is readily available in the field when needed to attach or detach the implement heads. FIG. 11 illustrates an "L-shaped" Phillips screwdriver (58) for this purpose. Tool recess groove 60 provides a nesting slot that brings attachment/detachment tool 58 flush with the surface of handle 10 so that a comfortable grip can be maintained anywhere on the handle. Finger recess 62 is provided to give the operator a convenient way to 'push out' the tool. FIG. 12 shows elastic retention band 56 in the tool retention position and the tool release position.

FIG. 13A, FIG. 13B, FIG. 13C, and FIG. 14 describe a means of attaching a tubular shank to a blade. FIG. 13A illustrates a method for attaching shank 12 to blade tang 64. In the attachment process, the blade tang is inserted into shank tube 68, as shown in FIG. 13B and FIG. 14. The lower portion of the shank tube is flattened to form flattened shank portion 42, as shown in FIG. 13C. When flattened, the shank tube is captured upon the blade tang by compressive force upon the tang. It is further restricted by compression against the outside perimeter of blade aperture 70. Capture shoulder 74 prevents the flattened portion of the shank tube from pulling out of the blade aperture. The flattening process cause grip nub 72 to bite into the flattened portion of the shank tube, further restricting lateral movement of the blade upon the shank. Optionally, the shank tube can be welded to capture shoulder 74 for a more rigid attachment.

FIG. 1, FIG. 4, FIG. 5, FIG. 6, and FIG. 7
Alternative Embodiments Although shank 12 is illustrated in these figures as tubular, it could be constructed of solid strap steel instead of tubular steel material.

Two shank channels could be provided on each end of the handle. However, this would add to the manufacturing costs without improving the utility of the invention.

Bolt retaining clip 52 is illustrated in FIG. 7 as an E-clip, however other types of retaining clips could be utilized.

Operation—FIG. 2, FIG. 3, FIG. 4, and FIG. 11

The operator can select a combination of two implement heads which are best suited to the cultivation task at hand. One of the two heads is attached to the first end of the handle, which has primary shank channel 14 to receive it. The other implement head is attached to the other end of the handle. It is attached into either the right hand shank channel 18 or the left hand shank channel 16, depending on which mode of operation is preferred—that is, left hand or right hand operation.

The implement heads are attached to the handle with shank bolt 32. As previously described, shank bolt 32 is captured within shank bolt hole 30 by retaining clip 52. Capturing shank bolt 32 within shank bolt hole 30 by means of a retaining clip prevents it from dropping out and being lost during the attachment/detachment process. This also prevents the operator from attaching the shank improperly by inserting the bolt on the wrong side of the shank. If shank bolt 32 was inserted from the opposite side of shank 12, in respect to the correct side as illustrated, the shank would be attached incorrectly and would likely be damaged when pressure was applied during operation. This is because fulcrum points 46 and 48 as shown in FIG. 4 are critical in relieving the stress on shank 12 in the area where shank bolt 32 passes though it. If attached incorrectly, the implement shank would be pushed away from the handle contact points instead of into them. The attachment mechanism as described herein prevents the operator from incorrectly attaching the implement head.

After the implement heads are attached, the operator can proceed to cultivate the garden. The operator can quickly change from one implement head to the other by 'swapping ends' of the handle.

The implement head that is not in use is located so that it projects outward, in relation to the operator. In this position, the non-working implement head will not present a hazard or inconvenience to the operator when this invention is moved back and forth in the process of garden cultivation.

The operator can grip the handle in several ways. Shank 12 of the implement head can be gripped by one hand while the other hand grips the handle nearer its fore-end.

Alternatively, the operator can grip the handle with both hands, in various positions on the handle. The ability to change grip positions can reduce fatigue during long-term operation.

For weeding, the operator will typically select a combination of a wide, shallow penetration implement head for one end of the handle and a narrow, deep penetration, implement head for the other end of the handle. In this way, the operator can use the wide blade to remove weeds between the rows. When needed, the operator can quickly exchange ends of the handle to use the narrow implement head to remove weeds between plants within the row or to dislodge large, deep rooted weeds when they are encountered.

For planting potatoes, the operator may attach a furrowing head to one end of the handle to use for forming a planting trench and also attach a wide-blade implement head to the other end to re-fill the trench made by the furrow head.

The above examples demonstrate how this invention achieves efficiency by providing the operator with two distinctive purpose implement heads at his/her immediate disposal.

The various implement heads can quickly be detached or attached by inserting or removing a single bolt. The bolt is inserted into the female threads of bolt tube 20, which is embedded in the handle. Attaching a implement head is generally about a thirty second process. The only tool required is a screwdriver or wrench, depending on the type of bolt used. The 'on-board' attachment/detachment tool illustrated in FIG. 11 and FIG. 12 provides a quick means to attach or detach the implement heads. To change an implement head, the operator slides the elastic retention band 56 off attachment/detachment tool 58 and removes said tool from its nesting slot. The implement head can then quickly be changed as described above.

Advantages

From the description above, a number of advantages of my invention become evident. A distinct advantage in efficiency is obtained by having two cultivation implements of specialized purpose at the operator's immediate disposal. My invention overcomes the common disadvantages associated with such designs. My invention places the not-in-use implement out of the way of the operator and allows for left-hand or right-hand operation.

A simple but very secure implement head attachment mechanism is provided which provides a very rapid attachment or detachment process. When compared to other implement attachment mechanisms, my invention's mechanism compares favorably in terms of rigidity, durability, cost of manufacturing, and ease and speed of operation.

This invention provides a high degree of flexibility by being adaptable to numerous common garden cultivation tasks. The conversion to each of the many configurations is fast and intuitive.

The manufacturing process to produce this product is economical because most tools and jigs required are simple and inexpensive. The hardware utilized is standard 'off the shelf' products or manufactured from standard dimension and easily available stock.

The ergonomic design lessens fatigue. For example, the square handle with eased edges is comfortable to grip and provides positive rotational control with a lighter grip when compared to a round handle.

The location and disposition of the implement shank places the implement head out of the way of the operator and can also provide a handy way to grasp the tool.

The on-board implement changing tool saves time and prevents the inconvenience of carrying the changing tool or looking for it.

This product can be shipped at standard rates without extra charges for 'over-sized' container or non-standard container shape.

Conclusions, Ramifications, and Scope

Although many approaches to a multipurpose cultivation tool have been tried over the years, an extensive search of prior art by the inventor has not disclosed an invention that provides a bolt tube that passes though the handle and can accept a shank attachment bolt from either side of the handle. This provides for both left-hand and right-hand operation.

Many other features make this invention distinguishable from prior art. These unique features include but are not limited to: the method and structure for implement attachment, the shank to implement blade attachment means, the design for 'on-board' storage of the attachment/detachment tool, the orientation of the implement heads to avoid conflict with the operator, the option for left-hand or right-hand use, the modification of a standard T-nut to resist pull out from either direction.

The bolt holding the implement shank onto the bolt tube secures the shank in one plane while the shank channel in the handle secures the shank from movement in the other plane. This channel also prevents the shank from projecting out from the handle, thereby providing a comfortable grip.

The trademark VersaTill will be claimed for this invention to emphasize the truly versatile features of this product. This invention provides versatility with practicality, durability, and economy. A variety of implement heads can be attached to either a short handle or long handle. The convenience of having two implements at the operator's immediate disposal can be a real 'time-saver'.

Prototypes have been field tested, revised, and retested until proven efficient and durable. Many prototypes were built and tested to achieve a design that is simple, effective, economical, and intuitive to assemble and operate. The manufacturing methods have been designed and short run production tooling has been built, proving economical American manufacturing is possible.

I am confident that my invention is an innovative and practical solution to reducing the time and effort spent in cultivating a garden.

I claim:

1. A garden cultivation tool with a replaceable implement comprising:
   a solid handle extending along an axis and sized to be grasped by a user along its length, the handle having a groove extending parallel to the axis, the groove being a channel open along one side and extending along the axis at one end of the handle;
   a first tool implement having a shank having a substantially constant cross-section along its length substantially equal in width to a width of the groove to fit tightly therein, the shank with a first hole therethrough to accept a bolt passing through the first hole and into a corresponding second hole in the groove and removed from an end of the solid handle, the second hole passing perpendicularly to the axis through the groove, so that the bolt as positioned through the first and second hole serves to retain the shank in the groove the shank extending along the axis and in the groove, the implement having a blade for cultivating;
   wherein the second hole in the groove holds a T-nut having a threaded tube terminating at a radially extending flange on a first side of the solid handle opposite the groove and wherein the T-nut is open at opposite ends to receive the bolt and wherein an end of the T-nut opposite the radially extending flange is expanded to a dimension larger than the hole thereby restricting movement by pull-out forces acting in either direction relative to the longitudinal axis of said T-nut.

2. The tool of claim 1 wherein said solid handle has a third hole being a through hole which will receive an L-shaped tool for attachment and detachment of said cultivation implements, the third hole terminating at a finger recess which is on the opposite side of the handle relative to the groove.

3. The tool of claim 1 wherein the bolt is held captive in the hole in the shank by a clip.

4. The tool of claim 1 wherein the shank has a portion of flattened cross-section, creating a substantially that surface of said shank, said flat surface contacting a bottom surface of the groove, thereby restricting rotational movement of said shank when attached thereto.

* * * * *